US012665477B2

(12) United States Patent
Furuta et al.

(10) Patent No.: US 12,665,477 B2
(45) Date of Patent: Jun. 23, 2026

(54) METHOD OF MANUFACTURING MOTOR AND MOTOR

(71) Applicant: SUBARU CORPORATION, Tokyo (JP)

(72) Inventors: Yoshitaka Furuta, Tokyo (JP); Akihito Katsume, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 211 days.

(21) Appl. No.: 18/691,673

(22) PCT Filed: Oct. 7, 2022

(86) PCT No.: PCT/JP2022/037699
§ 371 (c)(1),
(2) Date: Mar. 13, 2024

(87) PCT Pub. No.: WO2024/075291
PCT Pub. Date: Apr. 11, 2024

(65) Prior Publication Data
US 2025/0132649 A1 Apr. 24, 2025

(51) Int. Cl.
*H02K 15/40* (2025.01)
*H02K 1/18* (2006.01)

(52) U.S. Cl.
CPC ............... *H02K 15/40* (2025.01); *H02K 1/18* (2013.01)

(58) Field of Classification Search
CPC .......... H02K 15/40; H02K 1/18; H02K 1/185; H02K 5/24; H02K 15/14
See application file for complete search history.

(56) References Cited

U.S. PATENT DOCUMENTS

| | | | |
|---|---|---|---|
| 2010/0295408 A1 | 11/2010 | Boardman, IV | |
| 2017/0244307 A1* | 8/2017 | Matsumoto | H02K 5/24 |
| 2021/0104921 A1* | 4/2021 | Guarino | H02K 15/14 |

(Continued)

FOREIGN PATENT DOCUMENTS

| | | | | |
|---|---|---|---|---|
| CN | 113315266 A | * 8/2021 | | H02K 1/165 |
| JP | 2010-273535 A | 12/2010 | | |
| JP | 2013-093985 A | 5/2013 | | |

(Continued)

OTHER PUBLICATIONS

English translation of CN-113315266-A (Year: 2021).*

(Continued)

*Primary Examiner* — Tulsidas C Patel
*Assistant Examiner* — Joshua Kiel M Rodriguez
(74) *Attorney, Agent, or Firm* — Rimon P.C.

(57) ABSTRACT

A method of manufacturing a motor includes accommodating a stator in a case; inserting a fixing member having a rod shape into a circular ring of a collar member and a through hole formed in the stator, the collar member including the circular ring formed in an annular shape and a claw extending in a radial direction of the circular ring; positioning the stator relative to the case by bringing a tip of the claw into contact with an inner surface of the case; and fixing the stator to the case by tightening the fixing member such that the fixing member moves along an axial direction to deform the claw. When the stator is fixed to the case by the fixing member, the claw is not in contact with the inner surface of the case.

9 Claims, 13 Drawing Sheets

(56)            References Cited

U.S. PATENT DOCUMENTS

2021/0408867 A1    12/2021  Hiratsuka et al.

FOREIGN PATENT DOCUMENTS

JP        2016-086555  A      5/2016
JP        2020-150613  A      9/2020

OTHER PUBLICATIONS

International Search Report received in PCT Application No. PCT/JP2022/037699, dated Dec. 27, 2022.
Office Action dated Jan. 27, 2026, issued in corresponding Japanese patent application No. JP2024-555598.

* cited by examiner

METHOD OF MANUFACTURING MOTOR AND MOTOR

CROSS-REFERENCE TO RELATED APPLICATIONS

This application is the U.S. National Phase under 35 U.S.C. § 371 of International Application No. PCT/JP2022/037699, filed on Oct. 7, 2022.

TECHNICAL FIELD

The present invention relates to a method of manufacturing a motor and a motor.

BACKGROUND

For example, Patent Document 1 discloses a technique for aligning a stator relative to a case of a motor. In Patent Document 1, an H-section steel beam is disposed between a key bar attached to a notch of the stator and a spring bar attached to the case, whereby the key bar and the spring bar are aligned with each other. In Patent Document 1, positioning of the stator in a radial direction is performed by disposing a shim in a gap between the H-section steel beam and the key bar.

CITATION LIST

Patent Literature

Patent Document 1: Japanese Unexamined Patent Application Publication No. 2010-273535

SUMMARY

Technical Problem

Regarding positioning of a stator relative to a case, in addition to an aspect in which a member for positioning is used, there is also an aspect in which the positioning is performed by partially bringing an outer circumferential surface of the stator into contact with an inner surface of the case, for example. Even when the stator is positioned relative to the case, a position of the stator relative to the case may be shifted due to, for example, inaccurate positioning. In such a case, the stator may vibrate in a radial direction, and the vibration may be transmitted to the case through a member for positioning the stator, a portion where the outer circumferential surface of the stator and the inner surface of the case are in contact with each other, or the like. Then, the vibration transmitted to the case may be emitted to the outside of the motor as an unnecessary sound.

Therefore, an object of the present invention is to provide a method of manufacturing a motor and a motor that can achieve both alignment of a stator relative to a case and reduction of emission of the unnecessary sound.

Solution to Problem

In order to solve the above-described problem, a method of manufacturing a motor according to an embodiment of the present invention includes accommodating a stator in a case; inserting a fixing member having a rod shape into a circular ring of a collar member and a through hole formed in the stator, the collar member including the circular ring formed in an annular shape and a claw extending in a radial direction of the circular ring; positioning the stator relative to the case by bringing a tip of the claw into contact with an inner surface of the case; and fixing the stator to the case by tightening the fixing member in such a manner that the fixing member moves along an axial direction to deform the claw. When the stator is fixed to the case by the fixing member, the claw is not in contact with the inner surface of the case.

In order to solve the above-described problem, a motor according to an embodiment of the present invention includes a stator; a case that accommodates the stator; a fixing member that is formed in a rod shape and fixes the stator to the case; and a collar member. The collar member includes a circular ring formed in an annular shape; and a claw extending from the circular ring. The fixing member is inserted into the circular ring of the collar member and is inserted into a through hole formed in the stator. The stator is separated from an inner surface of the case in a radial direction of the stator. The claw has a length along an extending direction equal to an interval between the circular ring and the inner surface of the case and is not in contact with the inner surface of the case.

Advantageous Effects of Invention

According to the present invention, it is possible to achieve both alignment of the stator relative to the case and reduction of emission of an unnecessary sound.

DESCRIPTION OF EMBODIMENTS

An embodiment of the present invention will be described in detail below with reference to the accompanying drawings. Specific dimensions, materials, numerical values, and the like illustrated in the embodiment are merely examples for facilitating understanding of the invention, and do not limit the present invention unless otherwise specified. Note that in the present description and the drawings, redundant descriptions with respect to elements having substantially the same function and configuration are omitted because the same reference signs will be used, and elements that are not directly related to the present invention are omitted from the drawings.

Figure 1:
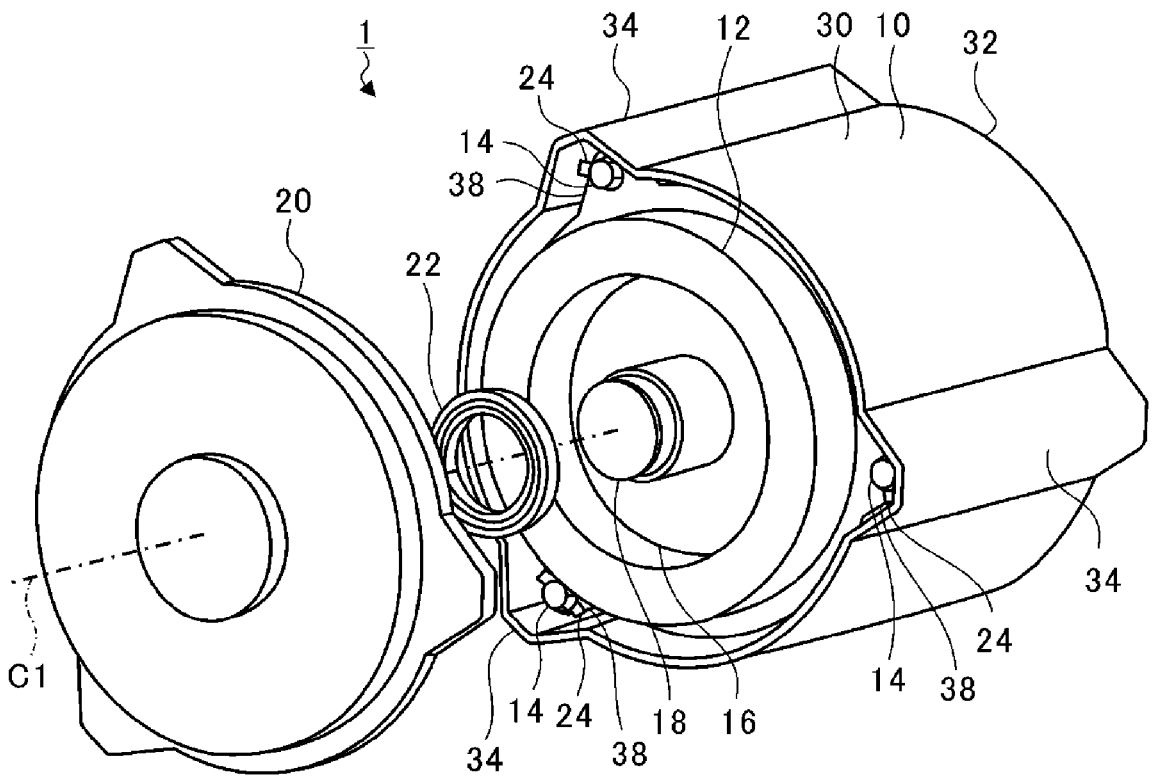
FIG. 1 is an exploded perspective view illustrating a configuration of a motor according to the present embodiment.
Figure 2:
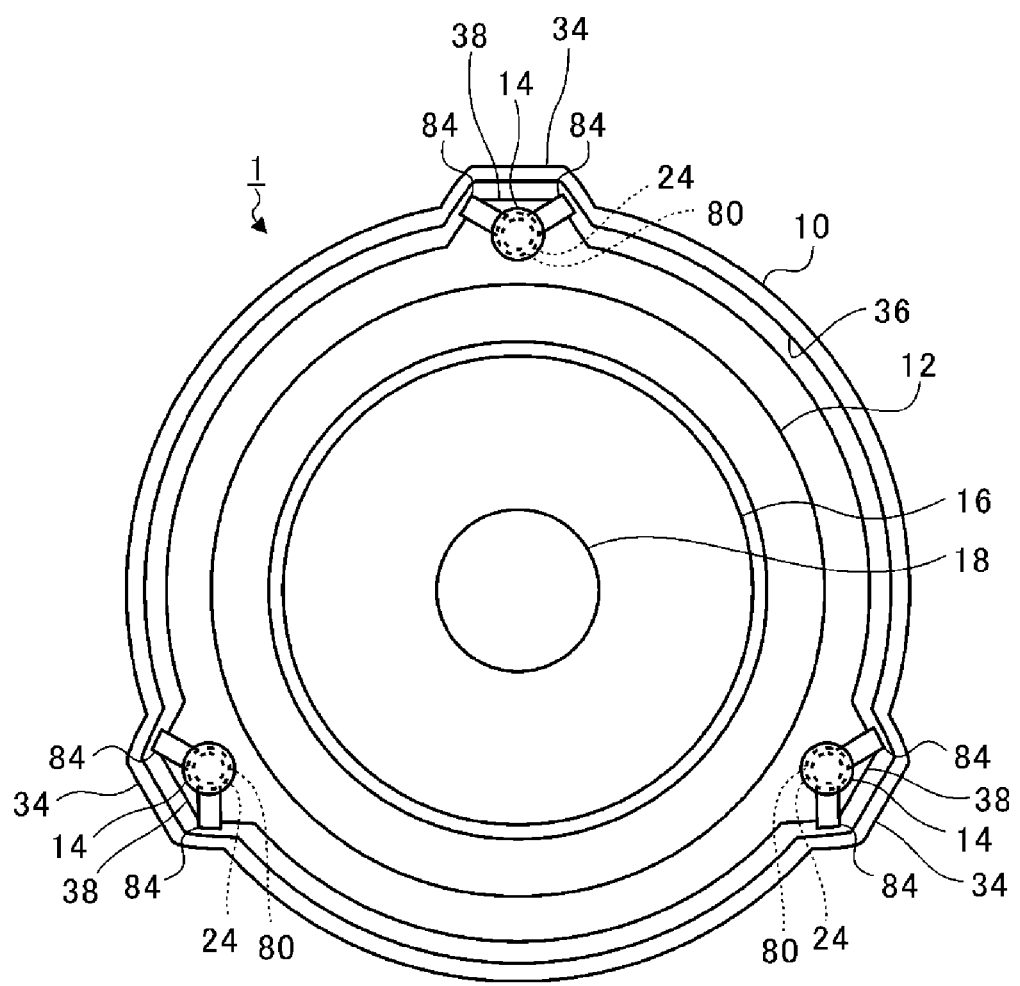
FIG. 2 is a perspective plan view illustrating the configuration of the motor according to the present embodiment.

FIG. 1 is an exploded perspective view illustrating a configuration of a motor 1 according to the present embodiment. FIG. 2 is a perspective plan view illustrating the configuration of the motor 1 according to the present embodiment. The motor 1 includes a case 10, a stator 12, fixing members 14, a rotor 16, a rotation shaft 18, a cover 20, a bearing 22, and collar members 24.

The case 10 includes a side surface 30 and a bottom surface 32. The side surface 30 is formed in a hollow cylindrical shape. The bottom surface 32 is provided on one end side of the side surface 30 in an axial direction and closes the one end side of the side surface 30. The side surface 30 and the bottom surface 32 are permanently affixed. The other end side of the side surface 30 in the axial direction is opened.

Case protrusions 34 protruding outward in a radial direction are formed on the side surface 30 of the case 10. The case protrusion 34 extends in the axial direction of the side surface 30. Multiple case protrusions 34 are formed at equal intervals in a circumferential direction of the side surface 30. For example, the case protrusions 34 are formed at three positions at intervals of 120 degrees.

The stator 12 is formed in a hollow cylindrical shape. An outer diameter of the stator 12 is smaller than an inner diameter of the side surface 30 of the case 10. The stator 12 is accommodated in the case 10. In a state where the stator 12 is accommodated in the case 10, an outer circumferential surface of the stator 12 is separated from the inner surface 36 of the case 10, that is, the inner surface of the side surface 30. That is, the stator 12 is separated from the inner surface of the case 10 in the radial direction of the stator 12.

The stator 12 is provided with stator protrusions 38 protruding radially outward. The stator protrusion 38 extends in the axial direction of the stator 12. The stator protrusion 38 has substantially the same shape as the case protrusion 34. Multiple stator protrusions 38 are formed at equal intervals in the circumferential direction of the stator 12. The stator protrusions 38 are formed in the same number and at the same intervals as the number and intervals of the case protrusions 34. For example, the stator protrusions 38 are formed at three positions at intervals of 120 degrees. The stator 12 is accommodated in the case 10 in an orientation in which the inner surface of the case protrusion 34 faces the outer surface of the stator protrusion 38.

The fixing member 14 is formed in a rod shape. The fixing member 14 extends in the axial direction of the stator 12. The fixing member 14 fixes the stator 12 to the case 10 in the axial direction of the stator 12. For example, the fixing member 14 fixes the stator 12 to the bottom surface 32 of the case 10. The fixing member 14 is disposed at a position where the stator protrusion 38 is formed in the stator 12. The fixing member 14 is provided for each stator protrusion 38. For example, the fixing members 14 are disposed at three positions at intervals of 120 degrees in the circumferential direction of the stator 12. That is, the stator 12 is fixed to the case 10 by the three fixing members 14.

The rotor 16 is formed in a cylindrical shape. An outer diameter of the rotor 16 is smaller than an inner diameter of the stator 12. The rotor 16 is accommodated in the stator 12. In a state where the rotor 16 is accommodated in the stator 12, a predetermined air gap is formed between the rotor 16 and the stator 12. In other words, the outer circumferential surface of the rotor 16 is separated from the inner circumferential surface of the stator 12.

The rotation shaft 18 is formed in a rod shape. The rotation shaft 18 is fitted into the rotor 16 so that a central axis of the rotation shaft 18 and a central axis of the rotor 16 coincide with each other and is integrated with the rotor 16. The central axes of the rotation shaft 18 and the rotor 16 correspond to the central axis C1 of the motor 1.

The cover 20 is attached to the case 10 to close an opening side end of the case 10. The bearings 22 are provided between the rotation shaft 18 and the cover 20, and between the rotation shaft 18 and the case 10. The bearings 22 rotatably support the rotation shaft 18 and the rotor 16 relative to the case 10 and the cover 20.

Although not illustrated, a slot is formed on the inner circumferential surface side of the stator 12, and a stator winding is accommodated in the slot. A magnet is embedded in the vicinity of the outer circumferential surface of the rotor 16. When an alternating current flows through the stator winding, a rotating magnetic field rotating in the circumferential direction is generated in the stator 12. The rotor 16 rotates in response to the rotation of the rotating magnetic field.

The rotor 16 is supported by the case 10 via the bearing 22 such that the central axis of the rotor 16 coincides with the central axis of the case 10. On the other hand, the stator 12 is fixed to the case 10 via the fixing member 14 such that the central axis of the stator 12 coincides with the central axis of the case 10. Thus, the rotor 16 is disposed inside the stator 12 such that the central axis of the rotor 16 coincides with the central axis of the stator 12.

Here, in order to make the central axis of the stator 12 coincide with the central axis of the case 10, radial positioning of the stator 12 relative to the case 10 is performed in a manufacturing process of the motor 1. Here, a conventional positioning method and problems thereof will be described, and then the motor 1 and a method of manufacturing the motor 1 according to the present embodiment for solving the conventional problems will be described.

Figure 3:
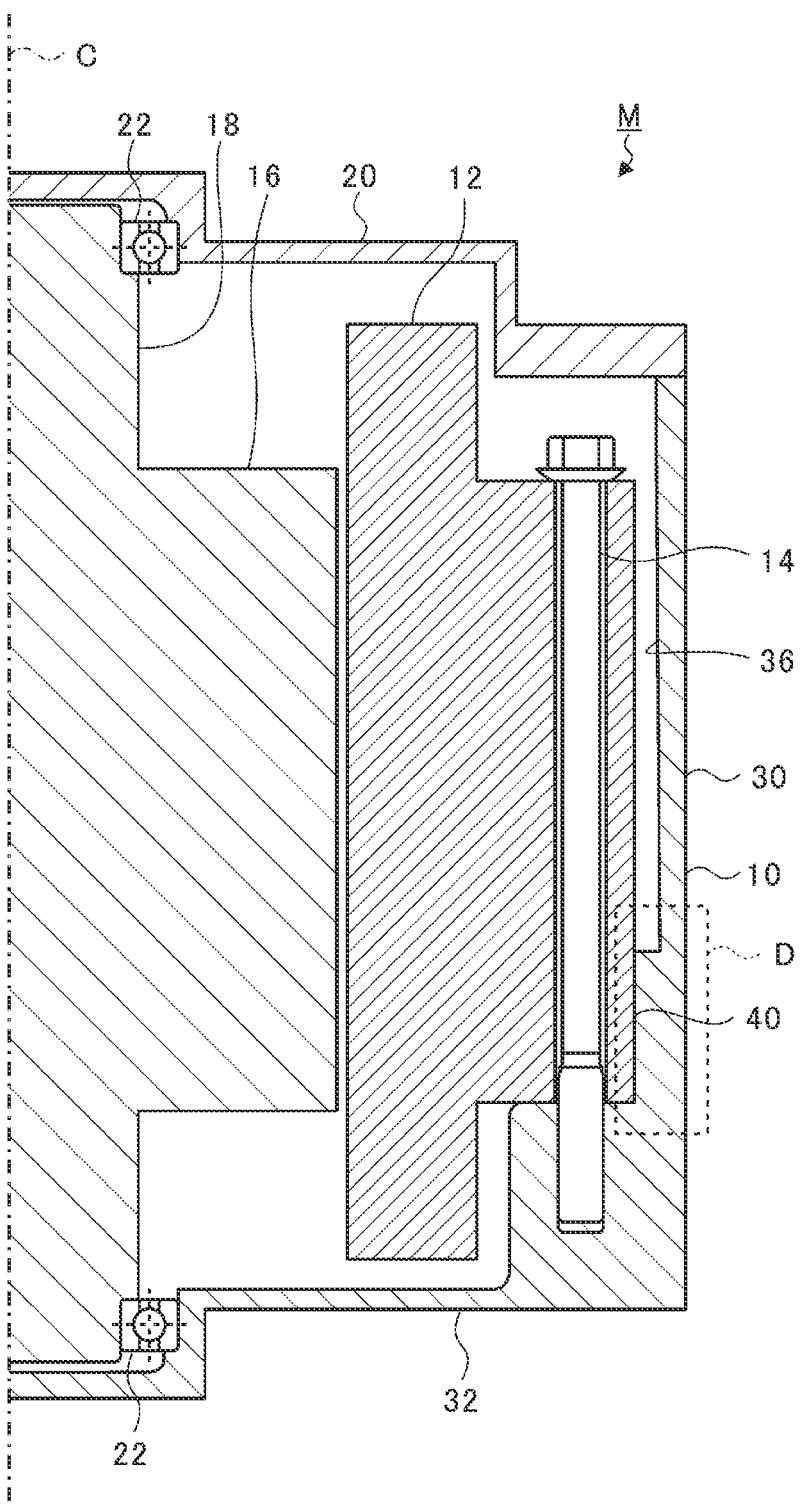
FIG. 3 is a longitudinal sectional view of a conventional motor.

FIG. 3 is a longitudinal sectional view of a conventional motor M. In FIG. 3, the right side of the longitudinal cross section of the motor M relative to the central axis C of the motor M is illustrated, and the left side relative to the central axis C is omitted.

As illustrated by a broken line D in FIG. 3, a fitting 40 is formed in a case 10 of the conventional motor M. The fitting 40 is formed on an inner surface of a side surface 30 close to a bottom surface 32. The fitting 40 is a portion of an inner surface of the case 10 that has a smaller inner diameter than other portions of the inner surface of the case 10. An inner diameter of the fitting 40 is substantially equal to an outer diameter of a stator 12. The stator 12 is fitted into the fitting 40 of the case 10. In the portion where the stator 12 is fitted into the fitting 40, an outer circumferential surface of the stator 12 is in contact with the inner surface 36 of the case 10.

As described above, in the conventional motor M, the stator 12 is positioned relative to the case 10 by fitting the stator 12 into the fitting 40 of the case 10.

Here, it is assumed that the stator 12 is fixed to the case 10 in a state where the central axis of the stator 12 is eccentric relative to the central axis of the case 10 due to a molding error of the fitting 40 or the like. In this case, the central axis of the rotor 16 is eccentric relative to the central axis of the stator 12, and the air gap between the rotor 16 and the stator 12 is biased around the central axis of the stator 12. As a result, the attractive force between the rotating magnetic field and the magnet varies around the central axis of the stator 12. When the rotating magnetic field rotates in this state, the stator 12 vibrates in the radial direction relative to the rotor 16 in such a manner that, for example, the stator 12 approaches the rotor 16 when the attractive force increases, and the stator 12 moves away from the rotor 16 when the attractive force decreases.

When such vibration of the stator 12 occurs, in the conventional motor M, the vibration of the stator 12 is transmitted to the case 10 through the fitting 40. Then, since the case 10 also vibrates in the radial direction due to the vibration transmitted to the case 10, the vibration of the case 10 is emitted to the outside of the motor M as a sound.

As described above, in the conventional motor M, when the position of the stator 12 in the radial direction relative to the case 10 is shifted from an appropriate position, an unnecessary sound is generated from the motor M.

Therefore, the motor 1 of the present embodiment includes the collar member 24 that can support the positioning of the stator 12 in the radial direction relative to the case 10. In the manufacturing process of the motor 1 of the present embodiment, the stator 12 is positioned using the collar member 24. In a state where the manufacturing of the motor 1 of the present embodiment is completed, the collar member 24 is not in contact with the inner surface of the case 10. Hereinafter, the motor 1 of the present embodiment and a method of manufacturing the motor 1 will be described in detail.

Figure 4:
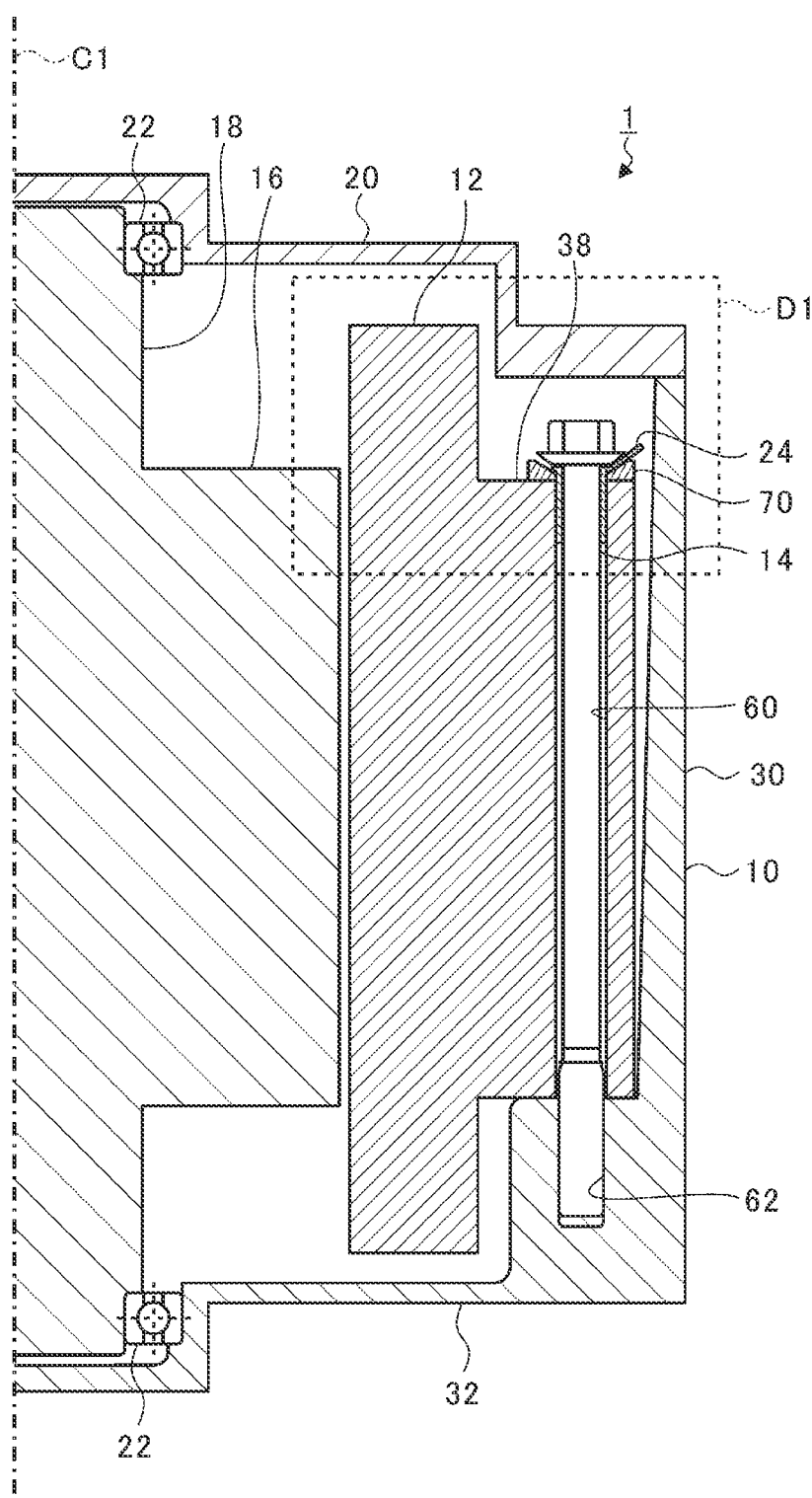
FIG. 4 is a longitudinal sectional view of the motor of the present embodiment.

FIG. 4 is a longitudinal sectional view of the motor 1 of the present embodiment. In FIG. 4, the right side of the longitudinal cross section of the motor 1 relative to the central axis C1 of the motor 1 is illustrated, and the left side relative to the central axis C1 is omitted. FIG. 4 illustrates a state where the manufacturing of the motor 1 is completed. As illustrated in FIG. 4, the motor 1 of the present embodiment is not provided with the fitting 40 of the conventional motor M.

Figure 5:
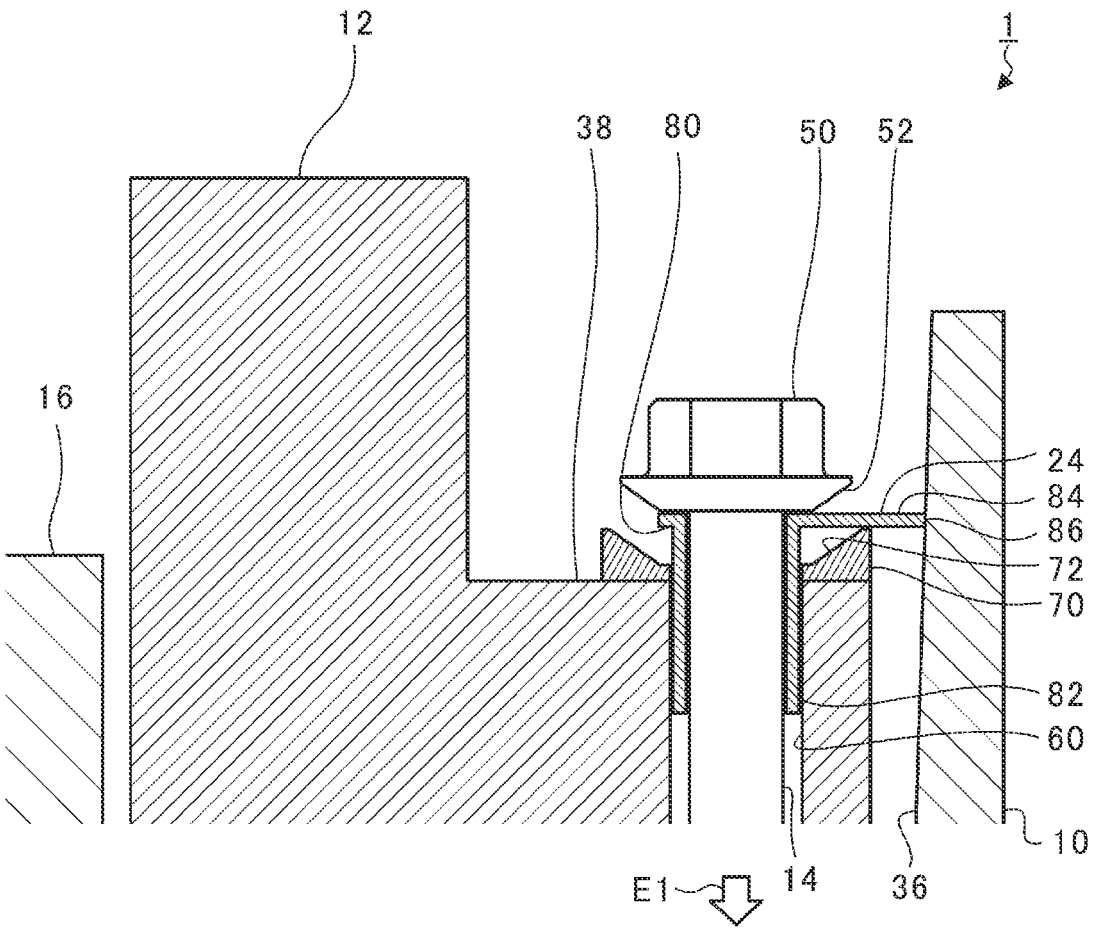
FIG. 5 is an enlarged partial longitudinal sectional view of a portion surrounded by a broken line in FIG. 4.
Figure 6:
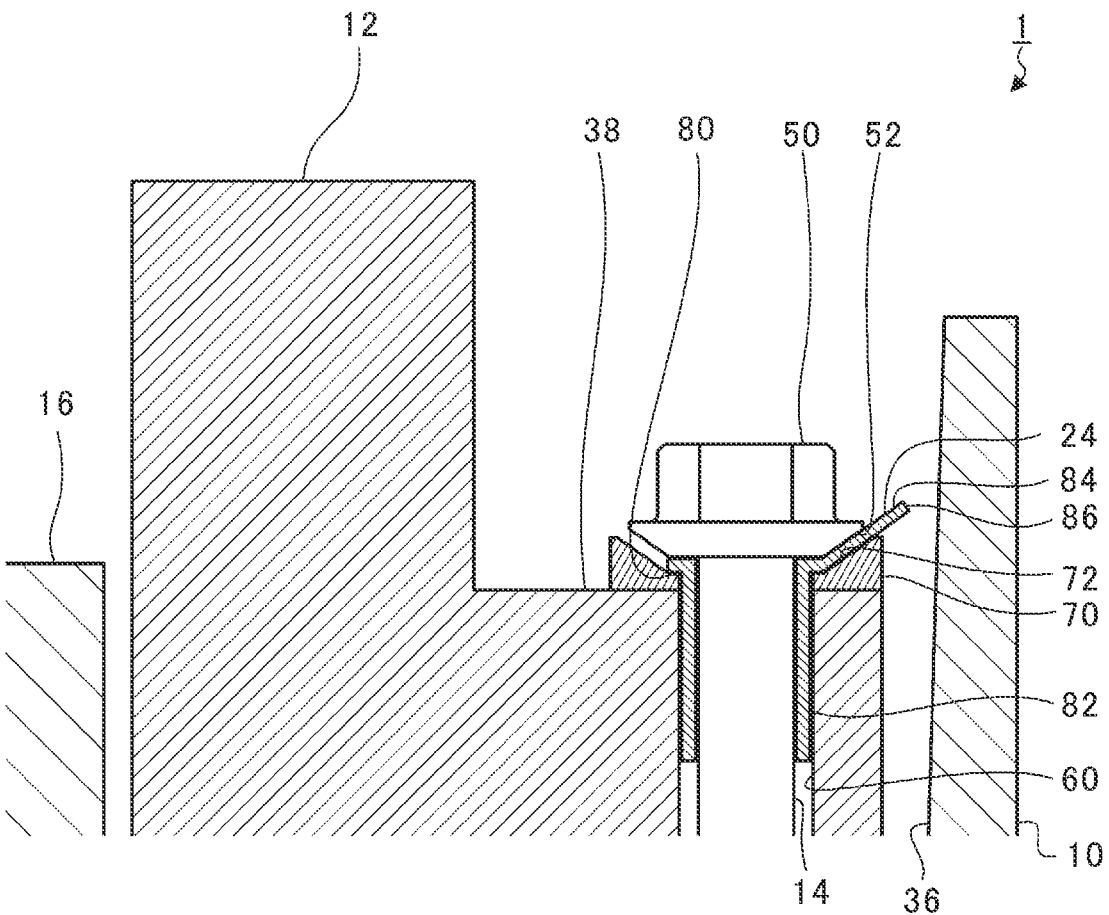
FIG. 6 is an enlarged partial longitudinal sectional view of the portion surrounded by the broken line in FIG. 4.

FIGS. 5 and 6 are enlarged partial longitudinal sectional views of a portion surrounded by a broken line D1 in FIG. 4. FIG. 5 illustrates an example before the stator 12 is fixed to the case 10 by the fixing member 14. FIG. 6 illustrates an example after the stator 12 is fixed to the case 10 by the fixing member 14. Hereinafter, for convenience of description, a state before the stator 12 is fixed to the case 10 by the fixing member 14 may be referred to as a pre-fixed state. A state after the stator 12 is fixed to the case 10 by the fixing member 14 may be referred to as a post-fixed state.

As illustrated in FIGS. 4 to 6, the fixing member 14 is, for example, a bolt. A head 50 is formed at one end of the fixing member 14 in the axial direction. The head 50 has a larger outer diameter than an outer diameter of other portions of the fixing member 14 in the axial direction. A bearing surface 52 of the head 50 is an inclined surface inclined relative to a flat surface perpendicular to the central axis of the fixing member 14. A thread is formed on the other end side of the fixing member 14 in the axial direction.

A through hole 60 extending through the stator 12 in the axial direction is formed in the stator protrusion 38 of the stator 12. The inner diameter of the through hole 60 is smaller than the outer diameter of the head 50 of the fixing member 14 and is larger than the outer diameter of a portion other than the head 50 of the fixing member 14. That is, a portion of the fixing member 14 other than the head 50 can be inserted into the through hole 60.

A screw hole 62 is formed in the bottom surface 32 of the case 10 in the axial direction of the case 10. The screw hole 62 is screwed with the thread of the fixing member 14.

A pedestal 70 is formed at an opening of the through hole 60 in the stator 12. The pedestal 70 receives the head 50 of the fixing member 14. The pedestal 70 is formed in an annular shape. For example, the pedestal 70 is formed as a member separate from the stator 12 and is attached to the stator 12.

Here, a flat surface perpendicular to the central axis of the through hole 60 may be referred to as a reference plane. An inclined surface 72 inclined relative to the reference plane is formed on the pedestal 70. For example, a height in the axial direction of the outer peripheral side of the pedestal 70 is greater than a height in the axial direction of the inner peripheral side of the pedestal 70. The inclined surface 72 of the pedestal 70 is inclined such that the height in the axial direction gradually increases from the inner peripheral side to the outer peripheral side of the pedestal 70. The inclined surface 72 of the pedestal 70 is inclined, for example, at about 30 degrees relative to the reference plane. The inclination angle of the inclined surface 72 of the pedestal 70 is not limited to the illustrated angle and may be set to any angle. The inclined surface 72 of the pedestal 70 is substantially parallel to the bearing surface 52 of the fixing member 14.

As described above, the motor 1 of the present embodiment includes the collar member 24. As illustrated in FIGS. 5 and 6, the collar member 24 includes a circular ring 80, a cylinder 82, and a claw 84.

The circular ring 80 is formed in an annular shape. The outer diameter of the circular ring 80 is, for example, smaller than the outer diameter of the head 50 of the fixing member 14. The inner diameter of the circular ring 80 is smaller than the outer diameter of the head 50 of the fixing member 14 and is larger than the outer diameter of a portion other than the head 50 of the fixing member 14.

The cylinder 82 is formed in a cylindrical shape. One end of the cylinder 82 in the axial direction is coupled to the circular ring 80. The cylinder 82 extends in the central axis direction of the circular ring 80. The other end of the cylinder 82 in the axial direction is opened. The outer diameter of the cylinder 82 is substantially equal to the inner diameter of the through hole 60 of the stator 12. The inner diameter of the cylinder 82 is smaller than the outer diameter of the head 50 of the fixing member 14 and is larger than the outer diameter of a portion other than the head 50 of the fixing member 14.

That is, a portion of the fixing member 14 other than the head 50 can be inserted into the circular ring 80 and the cylinder 82. The cylinder 82 can be inserted into the through hole 60 of the stator 12. When the cylinder 82 is inserted into the through hole 60, the outer circumferential surface of the cylinder 82 contacts the inner circumferential surface of the through hole 60. That is, the cylinder 82 is fitted to the inner surface of the through hole 60. The cylinder 82 is slidable in the axial direction relative to the through hole 60 while being fitted to the inner surface of the through hole 60.

The claw 84 extends from the circular ring 80. The circular ring 80, the cylinder 82, and the claw 84 are permanently affixed. The thickness of the claw 84 is set to, for example, about 0.5 mm to 1.0 mm. Therefore, the claw 84 is not deformed in a state where a force for fixing the stator 12 is not applied via the fixing member 14 and can be deformed when a force for fixing the stator 12 is applied via the fixing member 14. The thickness of the claw 84 is a dimension of the claw 84 in the axial direction of the circular ring 80 in the pre-fixed state. The thickness of the claw 84 is not limited to the exemplified thickness and may be any thickness at which the claw 84 can be deformed.

As illustrated in FIG. 2, the collar member 24 is provided with, for example, two claws 84. The two claws 84 are provided at a predetermined interval in the circumferential direction of the circular ring 80. Each claw 84 extends from the outer circumferential surface of the circular ring 80 toward the inner surface 36 of the case 10. Note that the number of claws 84 is not limited to the number illustrated and may be one, or three or more. Furthermore, the arrangement of the claw 84 is not limited to the exemplified aspect, and the claw 84 extends at least toward the inner surface 36 of the case 10.

As illustrated in FIG. 5, in the pre-fixed state, the claw 84 extends in the radial direction of the circular ring 80. In other words, the claw 84 extends along a flat surface perpendicular to the central axis of the circular ring 80. The claw 84 is a portion of the outer periphery of the circular ring 80 that protrudes radially outward from other portions of the outer periphery of the circular ring 80.

A length of the claw 84 in the extending direction in the pre-fixed state is set in accordance with the position where the stator 12 is to be installed relative to the case 10. The length of the claw 84 in the pre-fixed state is equal to an interval between the circular ring 80 and the inner surface of the case 10.

In the pre-fixed state, when the cylinder 82 is inserted into the through hole 60 and the collar member 24 is disposed such that the claw 84 face the inner surface 36 of the case 10, a tip 86 of the claw 84 comes into contact with the inner surface 36 of the case 10. Thus, the radial position of the stator 12 relative to the case 10 can be determined by the cylinder 82 fitting into the inner circumferential surface of the through hole 60 and the tip 86 of the claw 84 coming into contact with the inner surface 36 of the case 10. For example, the stator 12 is positioned relative to the collar member 24 by the cylinder 82 fitting into the inner surface of the through hole 60. The collar member 24 is positioned relative to the inner surface 36 of the case 10 by the tip 86 of the claw 84 coming into contact with the inner surface 36 of the case 10. Thus, the stator 12 is positioned relative to the inner surface 36 of the case 10 via the collar member 24.

As illustrated by a white arrow E1 in FIG. 5, the stator 12 can be fixed to the case 10 by the fixing member 14 by tightening the fixing member 14 such that the fixing member 14 moves along the axial direction. At this time, since the fixing member 14 moves along the axial direction, a force for fixing the stator 12 is applied to the collar member 24 via the fixing member 14. Then, a coupling portion side of the claw 84 with the circular ring 80 is pressed in the moving direction of the fixing member 14 by the head 50 of the fixing member 14. On the other hand, since the height of the outer peripheral side of the pedestal 70 is greater than the height of the inner peripheral side of the pedestal 70, the movement of the tip 86 side of the claw 84 in the movement direction of the fixing member 14 is restricted by the outer peripheral side of the pedestal 70. Accordingly, in the process of fixing the stator 12 to the case 10 by the fixing member 14, the claw 84 is deformed.

When the fixing of the stator 12 to the case 10 by the fixing member 14 is completed, the claw 84 is deformed into a shape extending along the inclined surface 72 of the pedestal 70 as illustrated in FIG. 6. In the post-fixed state, the tip 86 of the claw 84 is separated from the inner surface 36 of the case 10, and the claw 84 is in a state not in contact with the inner surface 36 of the case 10.

The claw 84 extends in a direction along a flat surface perpendicular to the central axis of the circular ring 80 in the pre-fixed state and extends in a direction along the inclined surface 72 of the pedestal 70 in the post-fixed state. As described above, the length of the claw 84 in the pre-fixed state is equal to the interval between the circular ring 80 and the inner surface 36 of the case 10. Therefore, even when the claw 84 is deformed by the fixing member 14 to extend in the direction along the inclined surface 72, the length of the claw 84 in the extending direction is substantially the same before and after the fixing by the fixing member 14. That is, even in the post-fixed state, the length along the extending direction of the claw 84, that is, the length along the direction of the inclined surface 72 of the claw 84, is equal to the interval between the circular ring 80 and the inner surface 36 of the case 10.

Figure 7:
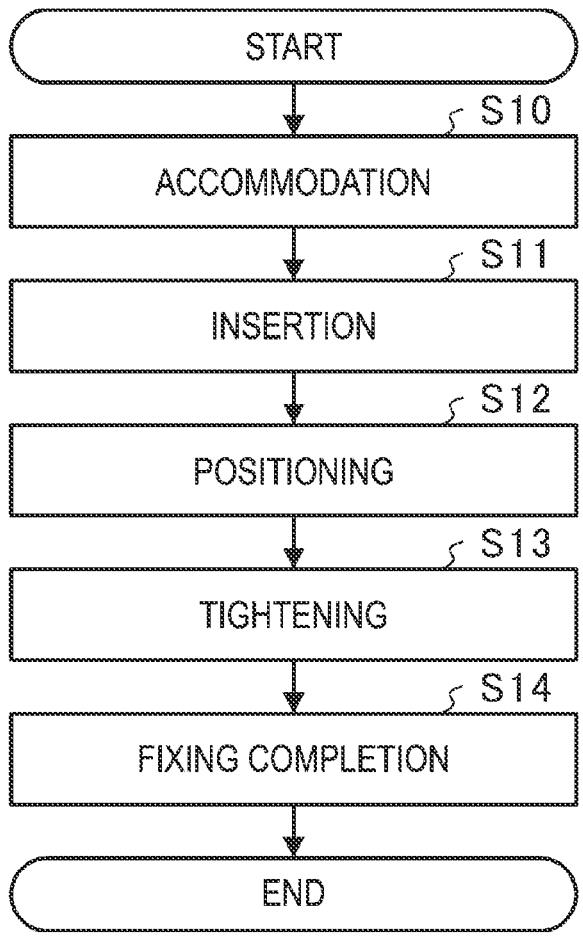
FIG. 7 is a flowchart illustrating a method of manufacturing a motor according to the present embodiment.

FIG. 7 is a flowchart illustrating a method of manufacturing the motor 1 according to the present embodiment. In FIG. 7, for convenience of explanation, steps related to fixing of the stator 12 to the case 10 are illustrated, and steps less related to the fixing are omitted.

First, an operator accommodates the stator 12 in the case 10 such that the central axis of the through holes 60 of the stator 12 and the central axis of the screw hole 62 of the case 10 substantially coincide with each other (S10).

Next, the operator inserts the fixing member 14 into the circular ring 80 of the collar member 24 and the through hole 60 of the stator 12 (S11). For example, the operator inserts the cylinder 82 of the collar member 24 into the through hole 60 of the stator 12 and fits the cylinder 82 to the inner circumferential surface of the through hole 60. The operator inserts the fixing member 14 into the circular ring 80 in a state where the cylinder 82 is inserted into the through hole 60. When the fixing member 14 is inserted into the circular ring 80, the fixing member 14 is also inserted into the cylinder 82 coupled to the circular ring 80. The fixing member 14 is inserted into the circular ring 80 from a tip opposite to the head 50. The tip of the fixing member 14 reaches the screw hole 62 of the case 10. For each of the multiple through holes 60 of the stator 12, the operator fits the cylinder 82 to the inner surface of the through hole 60 and inserts the fixing member 14 into the circular ring 80, the cylinder 82, and the through hole 60.

Next, the operator brings the tips 86 of the claw 84 of the collar member 24 into contact with the inner surface 36 of the case 10 to position the stator 12 relative to the case 10 (S12). For example, the operator adjusts the orientation of the collar member 24 such that the claw 84 of the collar member 24 having the cylinder 82 being inserted into the through hole 60 extends toward the inner surface 36 of the case 10. Then, the operator adjusts the position of the stator 12 in the radial direction relative to the case 10 such that the tips 86 of all the claws 84 of the multiple collar members 24 come into contact with the inner surface 36 of the case 10.

Next, the operator tightens the fixing member 14 such that the fixing member 14 moves along the axial direction, thereby deforming the claw 84 and fixing the stator 12 to the case 10 (S13). For example, the operator sets a tool for rotating the fixing member 14 on the head 50 of the fixing member 14. The operator rotates the fixing member 14 around the axis using the set tool and screws the thread of the fixing member 14 into the screw hole of the case 10. Then, the fixing member 14 moves along the axial direction so that the head 50 approaches the pedestal 70. When the head 50 approaches the pedestal 70, the case 10 and the stator 12 are tightened by the fixing member 14.

In this manner, in step S13, the operator tightens the head 50 of the fixing member 14 such that the head 50 is pressed against the pedestal 70 via the collar member 24. Then, the claw 84 located between the head 50 and the pedestal 70 is pressed against the inclined surface 72 of the pedestal 70 by the head 50. Accordingly, the claw 84 is deformed into a shape extending along the inclined surface 72 of the pedestal 70, and the tip 86 of the claw 84 is separated from the inner surface 36 of the case 10.

When a tightening torque of the fixing member 14 becomes equal to or greater than a predetermined torque, the tightening of the fixing member 14 is finished, and thus the fixing of the stator 12 to the case 10 is completed (S14). When the stator 12 is fixed to the case 10 by the fixing member 14, the collar member 24, for example, the claw 84 is not in contact with the inner surface 36 of the case 10.

In the description of the flowchart of FIG. 7, the operator performs the positioning and fixing of the stator relative to the case. However, the positioning and fixing of the stator relative to the case may be performed by a person other than the operator, such as a manufacturing robot.

As described above, the method of manufacturing the motor 1 of the present embodiment includes accommodating the stator 12 in the case 10; inserting the fixing member 14 having a rod shape into the circular ring 80 of the collar member 24 including the circular ring 80 and the claw 84, and the through hole 60 formed in the stator 12; positioning the stator 12 relative to the case 10 by bringing the tip 86 of the claw 84 into contact with the inner surface 36 of the case 10; and fixing the stator 12 to the case 10 by tightening the fixing member 14 such that the fixing member 14 moves along the axial direction and deforming the claw 84. In the method of manufacturing the motor 1 of the present embodiment, when the stator 12 is fixed to the case 10 by the fixing member 14, the claw 84 is not in contact with the inner surface 36 of the case 10.

Accordingly, in the method of manufacturing the motor 1 of the present embodiment, the position of the stator 12 relative to the case 10 can be appropriately adjusted by the collar member 24 in the pre-fixed state. As a result, in the method of manufacturing the motor 1 of the present embodiment, the central axis of the case 10 and the central axis of the stator 12 can be appropriately aligned with each other.

Furthermore, in the method of manufacturing the motor 1 according to the present embodiment, in the post-fixed state, the outer circumferential surface of the stator 12 is separated from the inner surface of the case 10, and the collar member 24 is not in contact with the inner surface 36 of the case 10. Therefore, even if the stator 12 vibrates in the radial direction, the vibration of the stator 12 is hindered from being transmitted to the inner surface 36 of the case 10. As a result, in the method of manufacturing the motor 1 of the present embodiment, even if the central axis of the case 10 and the central axis of the stator 12 are misaligned, it is possible to hinder an unnecessary sound from being generated from the case 10.

Therefore, according to the method of manufacturing the motor 1 of the present embodiment, it is possible to achieve both alignment of the stator 12 relative to the case 10 and reduction of emission of an unnecessary sound.

In addition, the claw 84 of the present embodiment is a portion of the outer periphery of the circular ring 80 that protrudes radially outward from other portions of the outer periphery of the circular ring 80. Therefore, in the method of manufacturing the motor 1 of the present embodiment, the positioning of the stator 12 relative to the case 10 can be more appropriately performed by using the claw 84.

In the method of manufacturing the motor 1 according to the present embodiment, in the fixing the stator 12, the claw 84 located between the head 50 and the pedestal 70 is deformed by tightening the head 50 of the fixing member 14 such that the head 50 is pressed against the pedestal 70 via the collar member 24. Accordingly, in the method of manufacturing the motor 1 of the present embodiment, the claw 84 can be deformed only by tightening the fixing member 14, and the claw 84 can be easily separated from the inner surface 36 of the case 10.

In the method of manufacturing the motor 1 according to the present embodiment, in the fixing the stator 12, the claw 84 is pressed against the inclined surface 72 by the head 50, so that the claw 84 is deformed into a shape extending along the inclined surface, and the tip 86 of the claw 84 is separated from the inner surface 36 of the case 10. Thus, in the method of manufacturing the motor 1 according to the present embodiment, the claw 84 can be more appropriately separated from the inner surface 36 of the case 10.

In the method of manufacturing the motor 1 according to the present embodiment, in the positioning the stator 12, the stator 12 is positioned relative to the case 10 by the cylinder 82 fitting into the inner circumferential surface of the through hole 60 and the tip 86 of the claw 84 coming into contact with the inner surface 36 of the case 10. Thus, in the method of manufacturing the motor 1 of the present embodiment, the stator 12 can be easily and appropriately positioned relative to the case 10.

In the motor 1 of the present embodiment, the stator 12 is separated from the inner surface 36 of the case 10 in the radial direction of the stator 12, the length of the claw 84 along the extending direction is equal to the interval between the circular ring 80 and the inner surface 36 of the case 10, and the claw 84 is not in contact with the inner surface 36 of the case.

Thus, in the motor 1 of the present embodiment, the outer circumferential surface of the stator 12 and the claw 84 are not in contact with the inner surface 36 of the case 10, so that even if the stator 12 vibrates in the radial direction, the vibration of the stator 12 is hindered from being transmitted to the inner surface 36 of the case 10. As a result, in the motor 1 of the present embodiment, even if the central axis of the case 10 and the central axis of the stator 12 are misaligned, it is possible to hinder an unnecessary sound from being generated from the case 10.

Furthermore, in the motor 1 of the present embodiment, the tip 86 of the claw 84 is separated from the inner surface 36 of the case 10, but the length of the claw 84 along the extending direction is equal to the interval between the circular ring 80 and the inner surface 36 of the case 10. This suggests that the radial positioning of the stator 12 relative to the case 10 is performed using the claw 84 in the manufacturing process of the motor 1. That is, in the motor 1 of the present embodiment, the position of the stator 12 relative to the case 10 can be appropriately adjusted by the claw 84 of the collar member 24.

Therefore, according to the motor 1 of the present embodiment, it is possible to achieve both alignment of the stator 12 relative to the case 10 and reduction of emission of an unnecessary sound.

Figure 8:
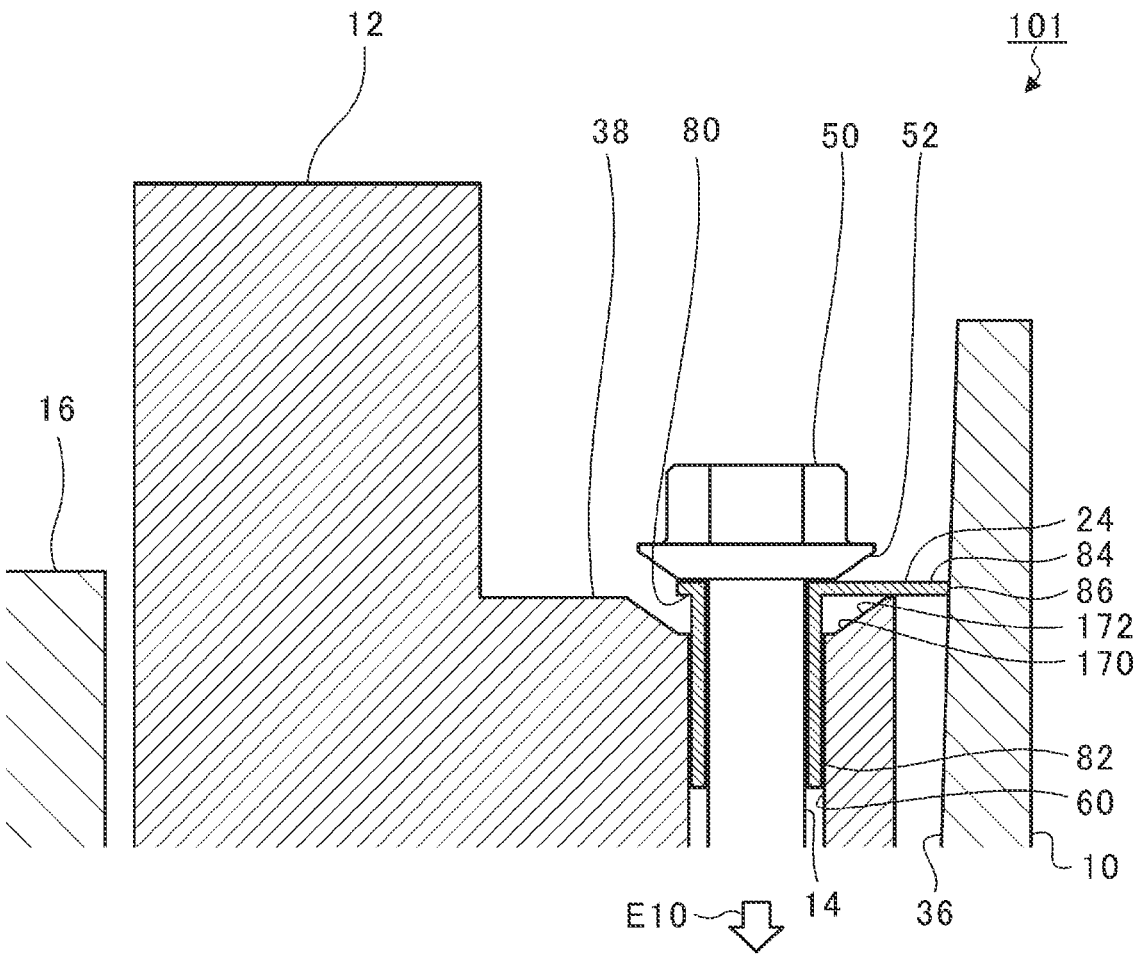
FIG. 8 is a partial longitudinal sectional view of a motor according to a first modification.
Figure 9:
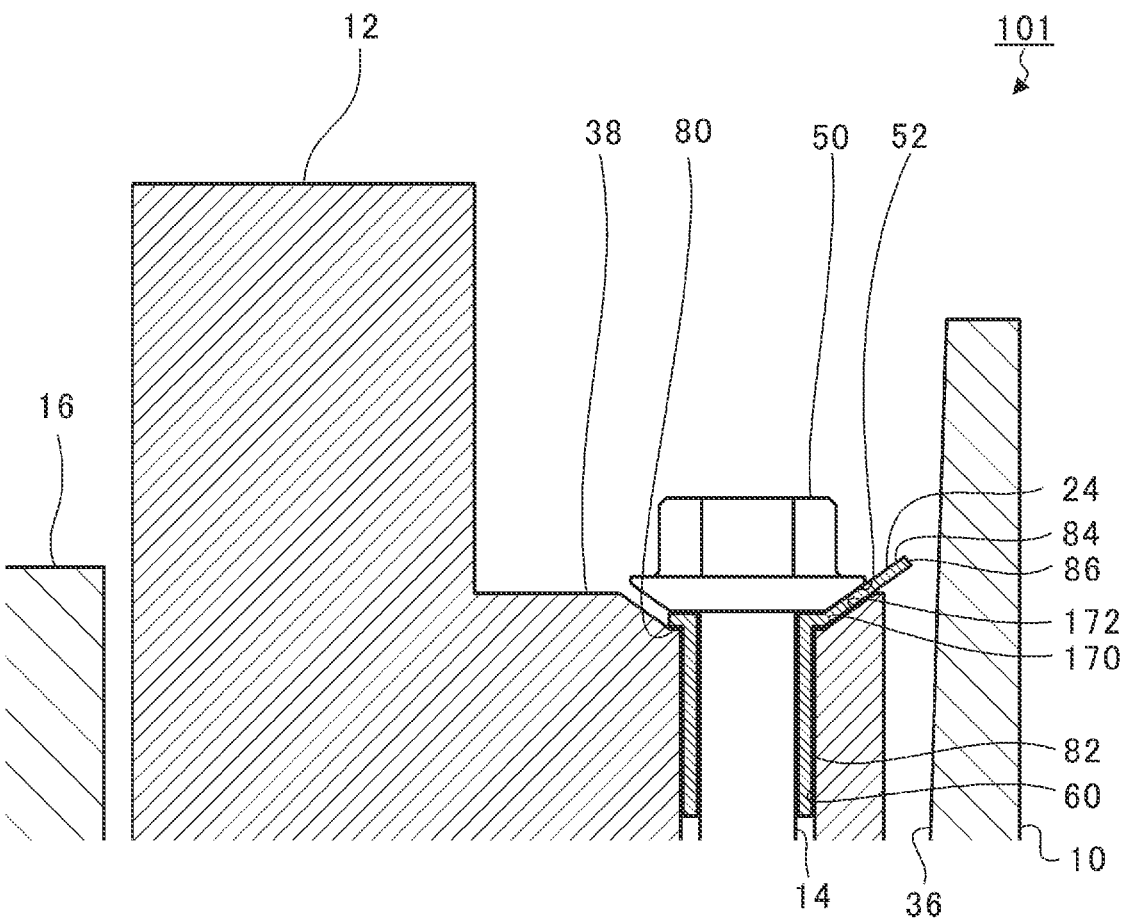
FIG. 9 is a partial longitudinal sectional view of the motor according to the first modification.

FIGS. 8 and 9 are partial longitudinal sectional views of a motor 101 according to a first modification. FIG. 8 illustrates a pre-fixed state of the motor 101 according to the first modification. FIG. 9 illustrates a post-fixed state of the motor 101 according to the first modification.

In the above-described embodiment, the pedestal 70 is formed as a separate member from the stator 12, and the pedestal 70 is attached to the stator 12. On the other hand, in the motor 101 of the first modification, a pedestal 170 is formed in the stator 12.

For example, the pedestal 170 is formed by forming the opening of the through hole 60 of the stator 12 so as to be recessed relative to the side surface of the stator 12 in the axial direction. Similarly to the pedestal 70 of the above-described embodiment, the pedestal 170 has an inclined surface 172 inclined relative to a reference plane, which is a flat surface perpendicular to the central axis of the through hole 60.

As illustrated in FIG. 8, in the pre-fixed state, the claw 84 extends in the radial direction of the circular ring 80. In the pre-fixed state, the stator 12 can be positioned relative to the case 10 by the tip 86 of the claw 84 coming into contact with the inner surface 36 of the case 10.

As illustrated by a white arrow E10 in FIG. 8, the fixing member 14 is tightened such that the fixing member 14 moves in the axial direction. Then, as illustrated in FIG. 9, the claw 84 between the head 50 of the fixing member 14 and the pedestal 170 is pressed against the inclined surface 172 of the pedestal 170 by the head 50. Accordingly, the claw 84 is deformed into a shape extending along the inclined surface 172 of the pedestal 170, and the tip 86 of the claw 84 is separated from the inner surface 36 of the case 10.

In the first modification, as in the above-described embodiment, the position of the stator 12 relative to the case 10 can be appropriately adjusted by the collar member 24 in the pre-fixed state.

Furthermore, in the first modification, as in the above-described embodiment, the outer circumferential surface of the stator 12 is separated from the inner surface 36 of the case 10, and the collar member 24 is not in contact with the inner surface 36 of the case 10 in the post-fixed state. As a result, even if the central axis of the case 10 and the central axis of the stator 12 are misaligned, it is possible to hinder an unnecessary sound from being generated from the case 10.

Figure 10:
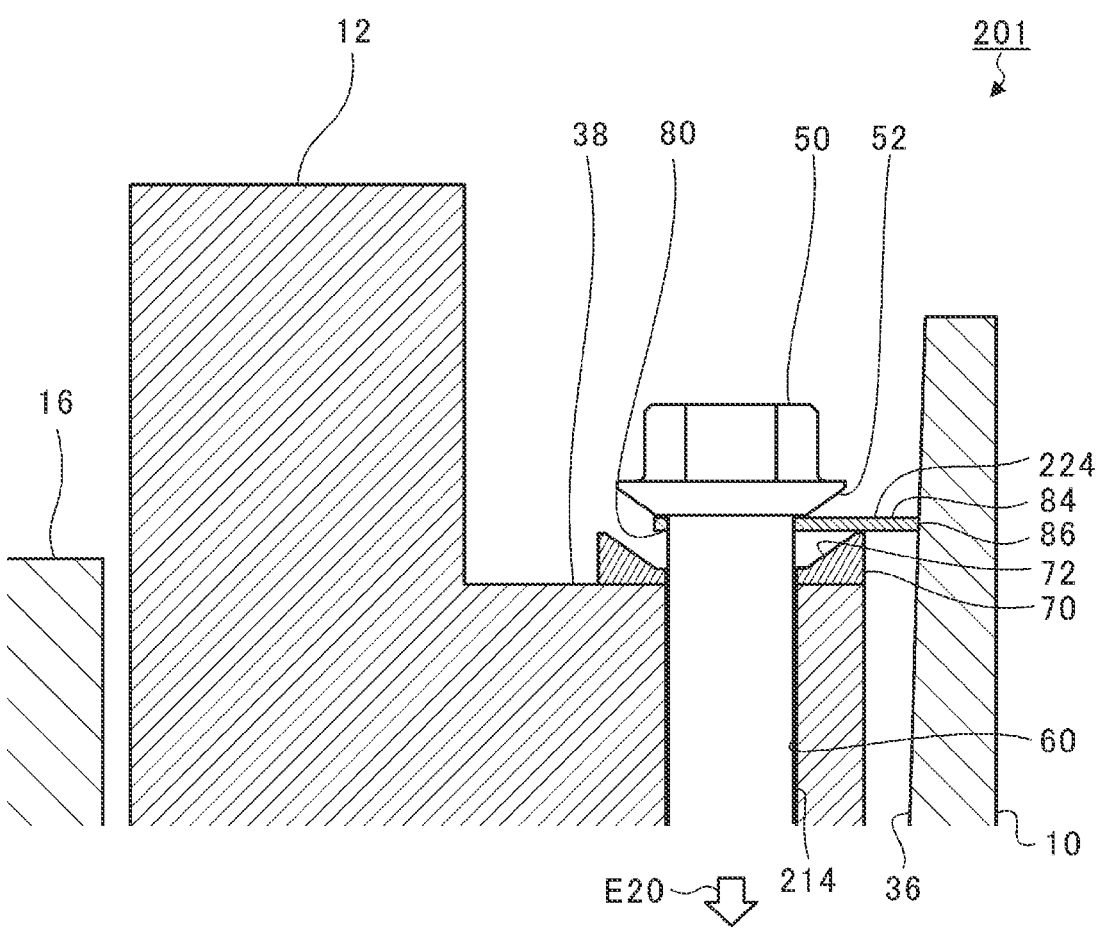
FIG. 10 is a partial longitudinal sectional view of a motor according to a second modification.
Figure 11:
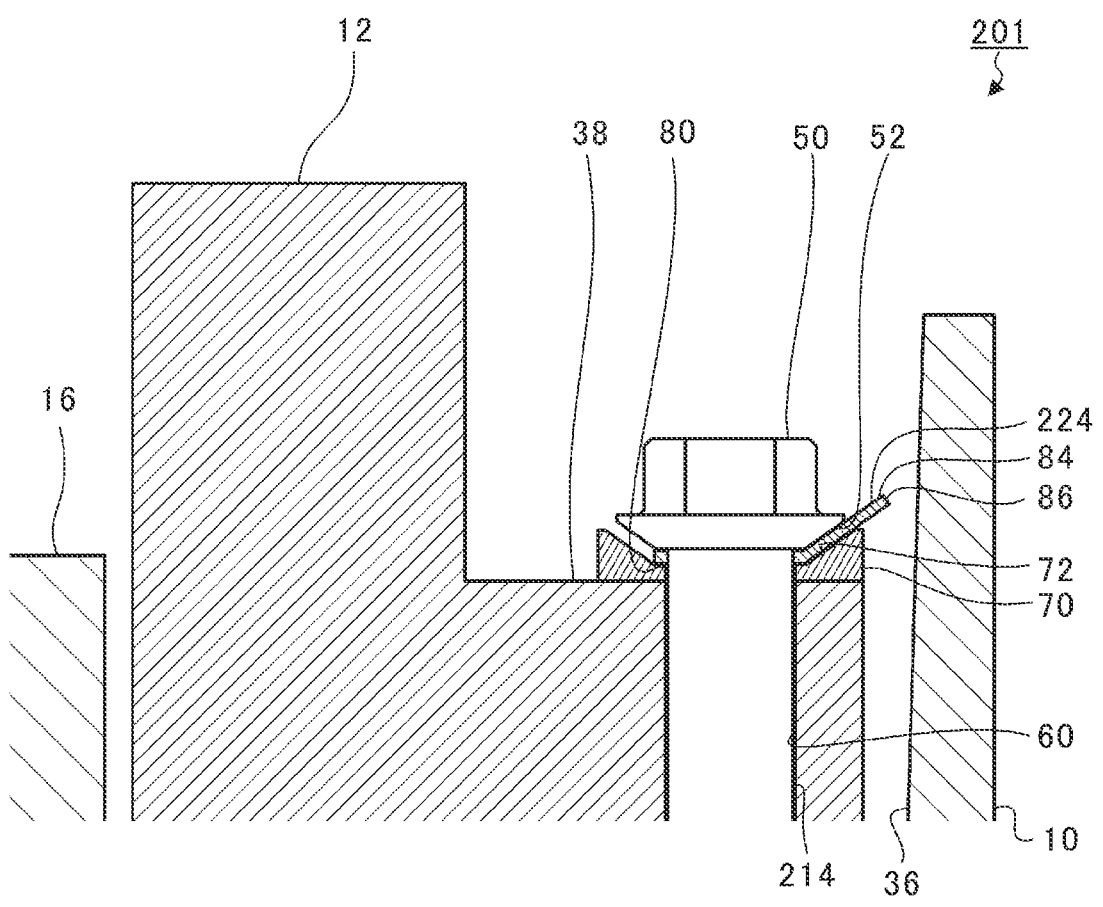
FIG. 11 is a partial longitudinal sectional view of the motor according to the second modification.

FIGS. 10 and 11 are partial longitudinal sectional views of a motor 201 according to a second modification. FIG. 10 illustrates a pre-fixed state of the motor 201 of the second modification. FIG. 11 illustrates a post-fixed state of the motor 201 according to the second modification.

The motor 1 of the above-described embodiment includes the collar member 24 including the circular ring 80, the cylinder 82, and the claw 84. In contrast, the motor 201 according to the second modification includes a collar member 224 instead of the collar member 24 according to the above-described embodiment. The collar member 224 of the second modification does not include the cylinder 82 and includes the circular ring 80 and the claw 84.

The motor 201 of the second modification includes a fixing member 214 instead of the fixing member 14 of the above-described embodiment. In the fixing member 214 of the second modification, the outer diameter of the rod-shaped portion between the head 50 and a threaded portion is substantially equal to the inner diameter of the through hole 60 of the stator. That is, the rod-shaped portion of the fixing member 214 is fitted to the inner circumferential surface of the through hole 60. In the fixing member 214, the outer diameter of the threaded portion is equal to or smaller than the outer diameter of the rod-shaped portion. The fixing member 214 is, for example, a so-called reamer bolt.

In the second modification, the inner diameter of the circular ring 80 is substantially equal to the outer diameter of the rod-shaped portion of the fixing member 214. That is, the rod-shaped portion of the fixing member 214 is fitted to the inner circumferential surface of the circular ring 80.

As illustrated in FIG. 10, in the pre-fixed state, the rod-shaped portion of the fixing member 214 is fitted to the inner circumferential surface of the through hole 60, whereby the stator 12 is positioned relative to the fixing member 214. In addition, the rod-shaped portion of the fixing member 214 is fitted to the inner circumferential surface of the circular ring 80, whereby the fixing member 214 is positioned relative to the collar member 224. The tip 86 of the claw 84 extending radially outward from the circular ring 80 comes into contact with the inner surface 36 of the case 10, whereby the collar member 224 is positioned relative to the inner surface 36 of the case 10. That is, in the second modification, the stator 12 can be positioned relative to the case 10 by the fixing member 214 and the collar member 224.

As illustrated by a white arrow E20 in FIG. 10, the fixing member 214 is tightened such that the fixing member 214 moves in the axial direction. Then, as illustrated in FIG. 11, the claw 84 between the head 50 of the fixing member 214 and the pedestal 70 is pressed against the inclined surface 72 of the pedestal 70 by the head 50. Accordingly, the claw 84 is deformed into a shape extending along the inclined surface 72 of the pedestal 70, and the tip 86 of the claw 84 is separated from the inner surface 36 of the case 10.

In the second modification, the position of the stator 12 relative to the case 10 can be appropriately adjusted by the fixing member 214 and the collar member 224 in the pre-fixed state.

Furthermore, in the second modification, as in the above-described embodiment, the outer circumferential surface of the stator 12 is separated from the inner surface 36 of the case 10, and the collar member 224 is not in contact with the inner surface 36 of the case 10 in the post-fixed state. As a result, even if the central axis of the case 10 and the central axis of the stator 12 are misaligned, it is possible to hinder an unnecessary sound from being generated from the case 10.

Figure 12:
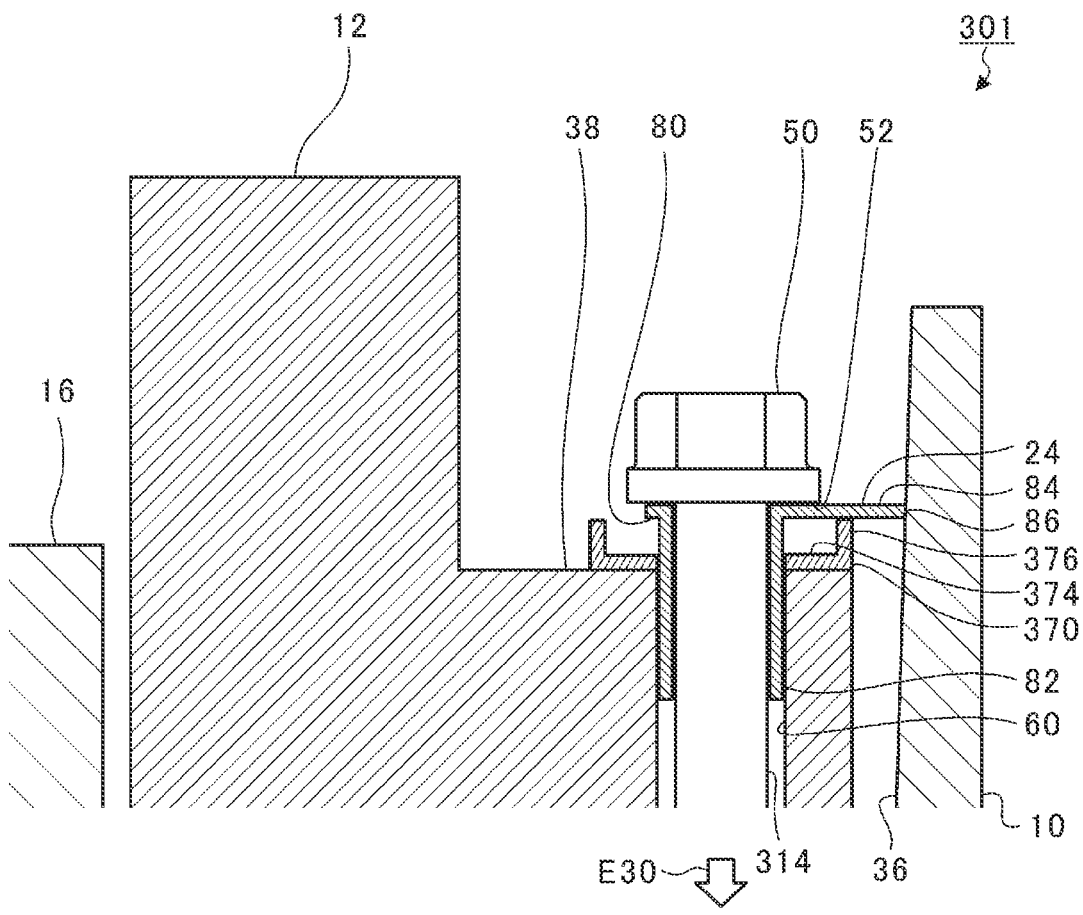
FIG. 12 is a partial longitudinal sectional view of a motor according to a third modification.
Figure 13:
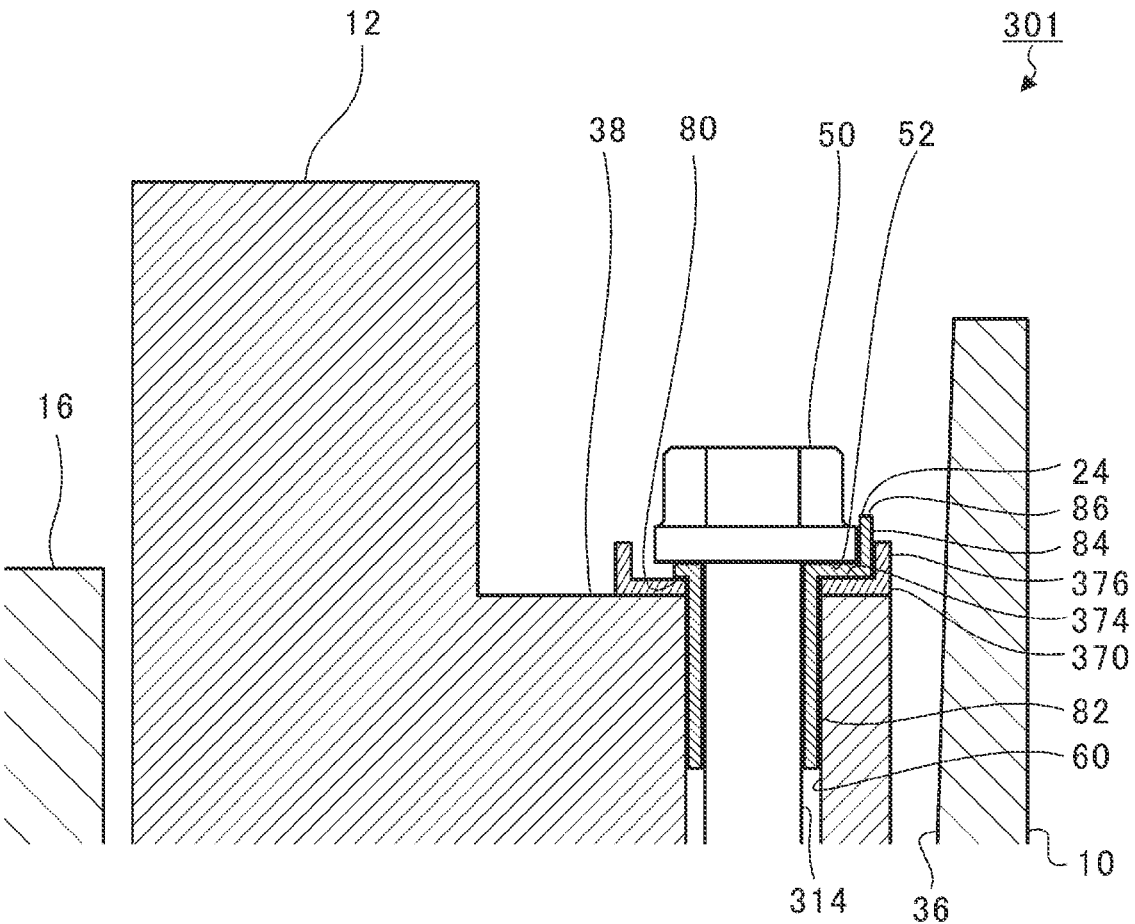
FIG. 13 is a partial longitudinal sectional view of the motor according to the third modification.

FIGS. 12 and 13 are partial longitudinal sectional views of a motor 301 according to a third modification. FIG. 12 illustrates a pre-fixed state of the motor 301 according to the third modification. FIG. 13 illustrates a post-fixed state of the motor 301 according to the third modification.

The motor 1 of the above-described embodiment includes the pedestal 70 having the inclined surface 72. In contrast, the motor 301 of the third modification includes a pedestal 370 instead of the pedestal 70 of the above-described embodiment.

The pedestal 370 of the third modification example has a flat surface 374 parallel to a reference plane, which is a flat surface perpendicular to the central axis of the through hole 60, and a protrusion 376 protruding from the flat surface 374. The protrusion 376 is located on the outer circumferential surface side of the pedestal 370. The flat surface 374 is located on the inner circumferential surface side of the pedestal 370. The protrusion 376 is a cylindrical portion extending along the central axis of the through hole 60.

The motor 301 of the third modification includes a fixing member 314 instead of the fixing member 14 of the above-described embodiment. In the fixing member 314 of the third modification, the bearing surface 52 of the head 50 is a flat surface parallel to the reference plane. The inner diameter of the protrusion 376 of the pedestal 370 is larger than the outer diameter of the head 50.

As illustrated in FIG. 12, in the pre-fixed state, the claw 84 extends in the radial direction of the circular ring 80. The claw 84 is supported by the protrusion 376 of the pedestal 370. In the pre-fixed state, the stator 12 can be positioned relative to the case 10 by the tip 86 of the claw 84 coming into contact with the inner surface 36 of the case 10.

As illustrated by a white arrow E30 in FIG. 12, the fixing member 314 is tightened such that the fixing member 314 moves in the axial direction. Then, as illustrated in FIG. 13, the claw 84 between the head 50 of the fixing member 314 and the pedestal 370 is pressed against the flat surface 374 of the pedestal 370 by the head 50. On the other hand, the tip 86 side of the claw 84 is restricted from moving in the moving direction of the fixing member 314 by the protrusion 376 of the pedestal 370. Therefore, the claw 84 is deformed so as to be bent at a portion proximate to the boundary between the protrusion 376 and the flat surface 374 of the pedestal 370, and the tip 86 of the claw 84 is separated from the inner surface 36 of the case 10.

In the third modification, as in the above-described embodiment, the position of the stator 12 relative to the case 10 can be appropriately adjusted by the collar member 24 in the pre-fixed state.

Furthermore, in the third modification, as in the above-described embodiment, the outer circumferential surface of the stator 12 is separated from the inner surface 36 of the case 10, and the collar member 24 is not in contact with the inner surface 36 of the case 10 in the post-fixed state. As a result, even if the central axis of the case 10 and the central axis of the stator 12 are misaligned, it is possible to hinder an unnecessary sound from being generated from the case 10.

An embodiment of the present invention is described above with reference to the accompanying drawings, but the present invention is not limited to such an embodiment. It is apparent to those skilled in the art that various changes and corrections can be conceived in the scope of the claims, and it is thus acknowledged that those changes and corrections are also naturally included in the technical scope of the present invention.

For example, in the above-described embodiment, a threaded portion of the fixing member 14 is screwed into the screw hole 62 of the case 10. However, the screw hole 62 of the case 10 may be replaced with a through hole, and the fixing member 14 may be inserted into the through hole of the case 10. The tightening of the fixing member 14 may be performed by screwing a nut onto the threaded portion of the fixing member 14, which protrudes to the outside of the case 10.

In addition, the features of the above-described embodiment and the above-described modifications may be appropriately combined. For example, the first modification and the second modification may be combined to have a configuration in which the pedestal 170 of the first modification is provided and the collar member 224 and the fixing member 214 of the second modification are provided. It is not limited to the exemplified combinations.

REFERENCE SIGNS LIST 1, 101, 201, 301 Motor
10 Case
12 Stator
14, 214, 314 Fixing member
24, 224 Collar member
36 Inner surface
50 Head
60 Through hole
70, 170, 370 Pedestal
72, 172 Inclined surface
80 Circular ring 82 Cylinder
84 Claw
86 Tip

The invention claimed is:

1. A method of manufacturing a motor, the method comprising:
    accommodating a stator in a case;
    inserting a fixing member having a rod shape into a circular ring of a collar member and a through hole formed in the stator, the collar member comprising the circular ring formed in an annular shape and a claw extending in a radial direction of the circular ring;
    positioning the stator relative to the case by bringing a tip of the claw into contact with an inner surface of the case; and
    fixing the stator to the case by tightening the fixing member in such a manner that the fixing member moves along an axial direction to deform the claw,
    wherein when the stator is fixed to the case by the fixing member, the claw is not in contact with the inner surface of the case.

2. The method of manufacturing a motor according to claim 1, wherein the claw is a portion of an outer periphery of the circular ring, the portion protruding more radially outward than other portions of the outer periphery of the circular ring.

3. The method of manufacturing a motor according to claim 2,
    wherein a head is formed at one end of the fixing member in the axial direction, the head having an outer diameter larger than an outer diameter of other portions of the fixing member in the axial direction,
    wherein a pedestal is formed at an opening of the through hole in the stator, the pedestal being configured to receive the head of the fixing member, and
    wherein in the fixing the stator, the claw located between the head and the pedestal is deformed by tightening the head of the fixing member in such a manner that the head is pressed against the pedestal via the collar member.

4. The method of manufacturing a motor according to claim 3,
    wherein an inclined surface is formed at the pedestal, the inclined surface being inclined relative to a reference plane that is a flat surface perpendicular to a central axis of the through hole,
    wherein in the positioning the stator, the tip of the claw comes into contact with the inner surface of the case by the claw extending along the reference plane, and
    wherein in the fixing the stator, the tip of the claw is separated from the inner surface of the case by the claw being pressed against the inclined surface by the head and the claw being deformed into a shape extending along the inclined surface.

5. The method of manufacturing a motor according to claim 2,
    wherein a cylinder is coupled to the circular ring, the cylinder extending in a central axis direction of the circular ring, and
    wherein in the positioning the stator, the stator is positioned relative to the case by the cylinder being fitted to an inner circumferential surface of the through hole and the tip of the claw being in contact with the inner surface of the case.

6. The method of manufacturing a motor according to claim 1,
    wherein a head is formed at one end of the fixing member in the axial direction, the head having an outer diameter larger than an outer diameter of other portions of the fixing member in the axial direction, wherein a pedestal is formed at an opening of the through hole in the stator, the pedestal being configured to receive the head of the fixing member, and wherein in the fixing the stator, the claw located between the head and the pedestal is deformed by tightening the head of the fixing member in such a manner that the head is pressed against the pedestal via the collar member.

7. The method of manufacturing a motor according to claim 6, wherein an inclined surface is formed at the pedestal, the inclined surface being inclined relative to a reference plane that is a flat surface perpendicular to a central axis of the through hole, wherein in the positioning the stator, the tip of the claw comes into contact with the inner surface of the case by the claw extending along the reference plane, and wherein in the fixing the stator, the tip of the claw is separated from the inner surface of the case by the claw being pressed against the inclined surface by the head and the claw being deformed into a shape extending along the inclined surface.

8. The method of manufacturing a motor according to claim 1, wherein a cylinder is coupled to the circular ring, the cylinder extending in a central axis direction of the circular ring, and wherein in the positioning the stator, the stator is positioned relative to the case by the cylinder being fitted to an inner circumferential surface of the through hole and the tip of the claw being in contact with the inner surface of the case.

9. A motor comprising:

a stator;

a case configured to accommodate the stator;

a fixing member formed in a rod shape and configured to fix the stator to the case; and a collar member, wherein the collar member comprises
a circular ring formed in an annular shape; and
a claw extending from the circular ring, wherein the fixing member is inserted into the circular ring of the collar member and is inserted into a through hole formed in the stator, wherein the stator is separated from an inner surface of the case in a radial direction of the stator, and wherein the claw has a length along an extending direction equal to an interval between the circular ring and the inner surface of the case and is not in contact with the inner surface of the case.

* * * * *